April 29, 1947.   H. PELPHREY   2,419,726
AUTOMATIC WORM GEAR HOBBING MACHINE
Filed March 21, 1942   6 Sheets-Sheet 5
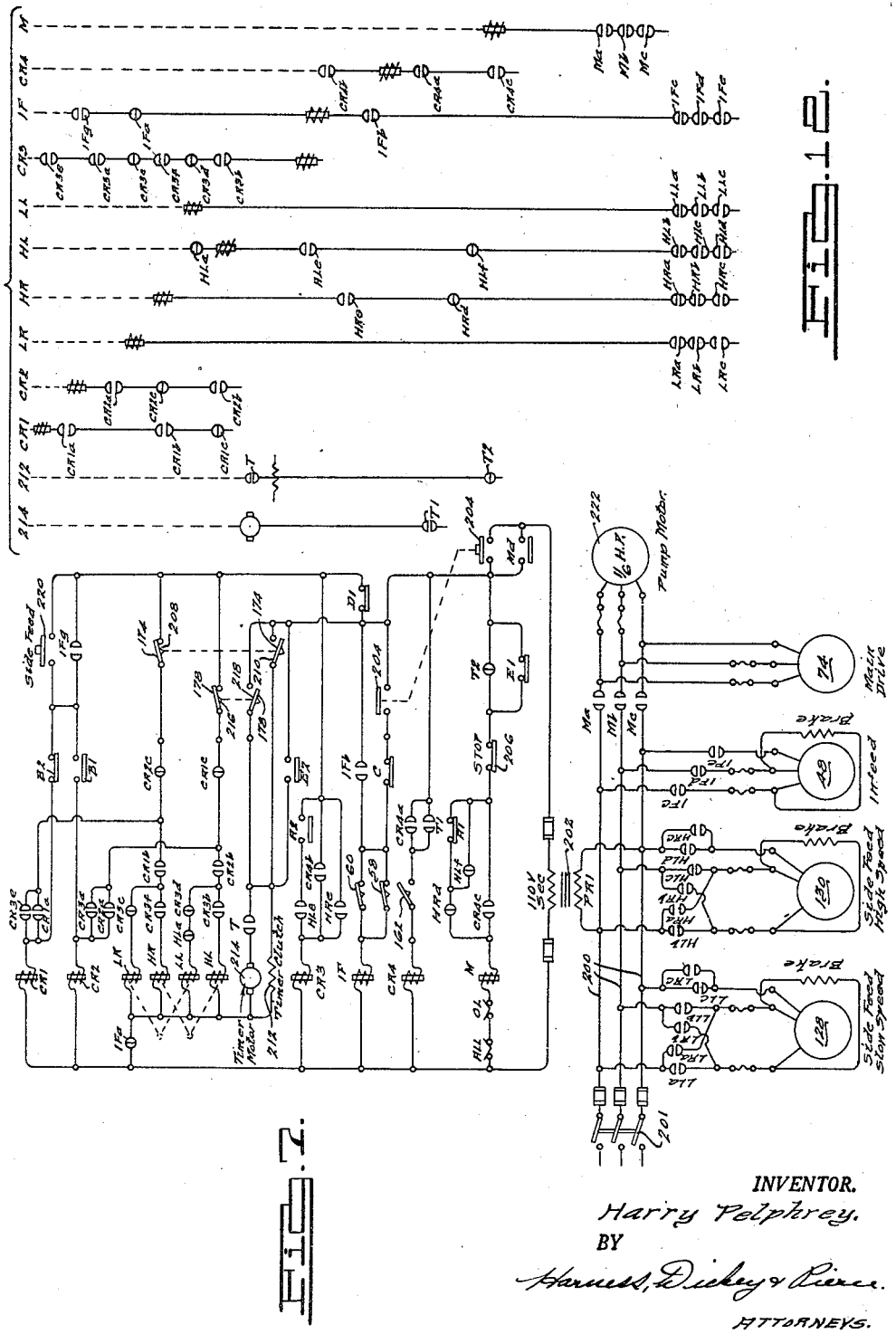
INVENTOR.
Harry Pelphrey.
BY
Harness, Dickey & Pierce
ATTORNEYS.

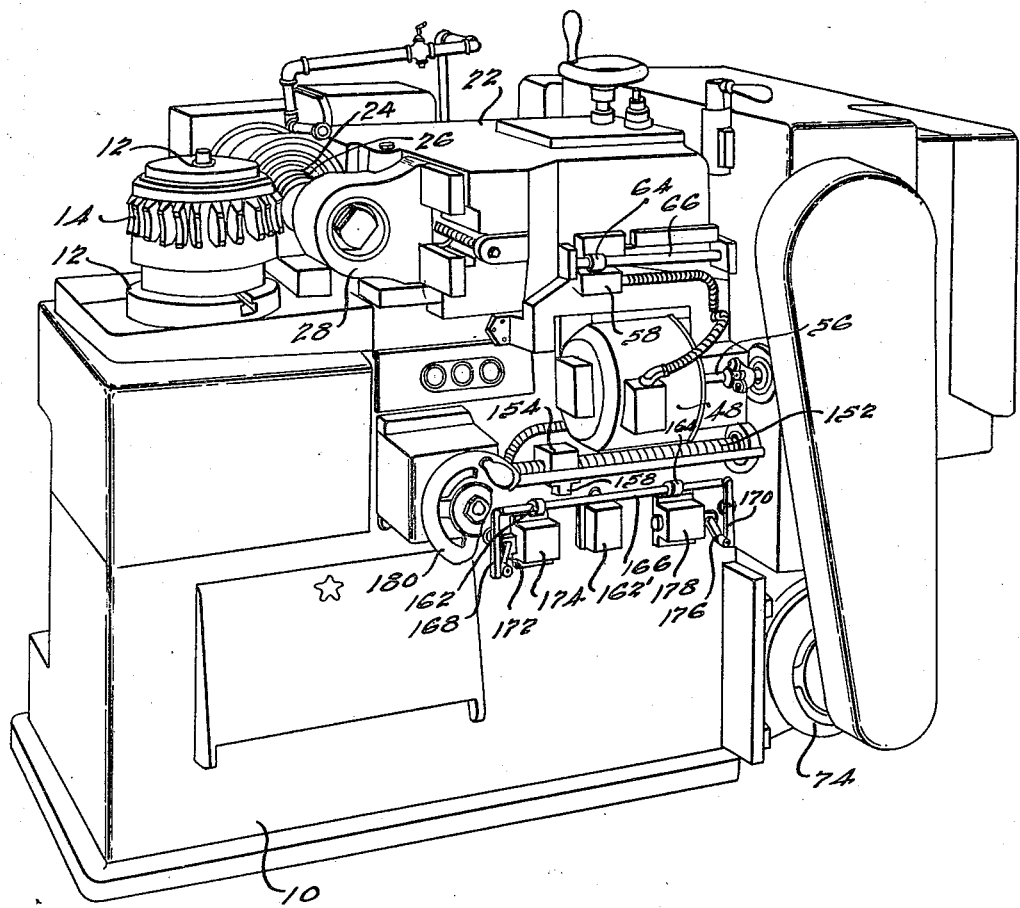

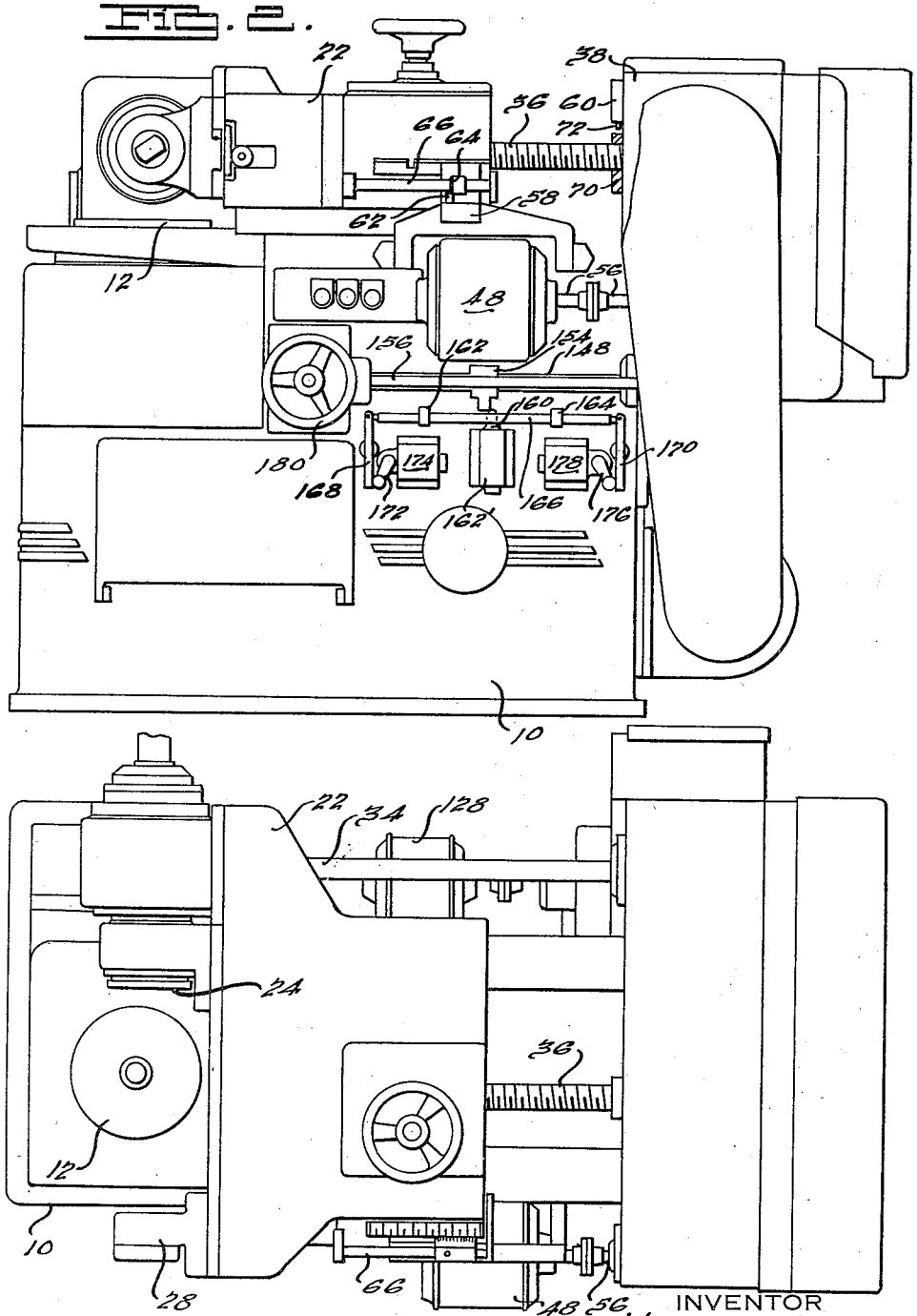

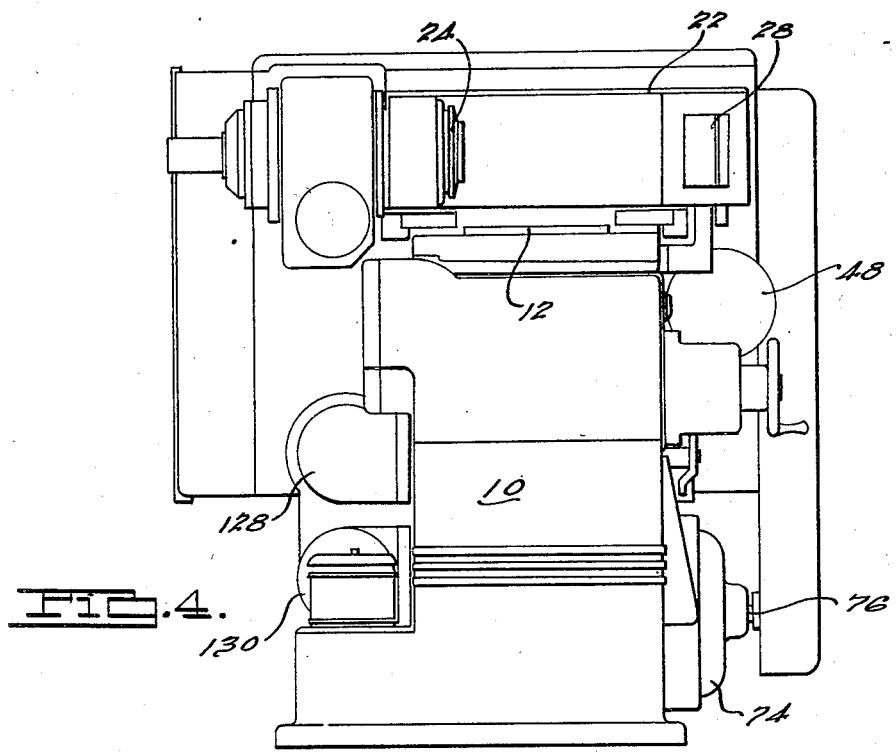
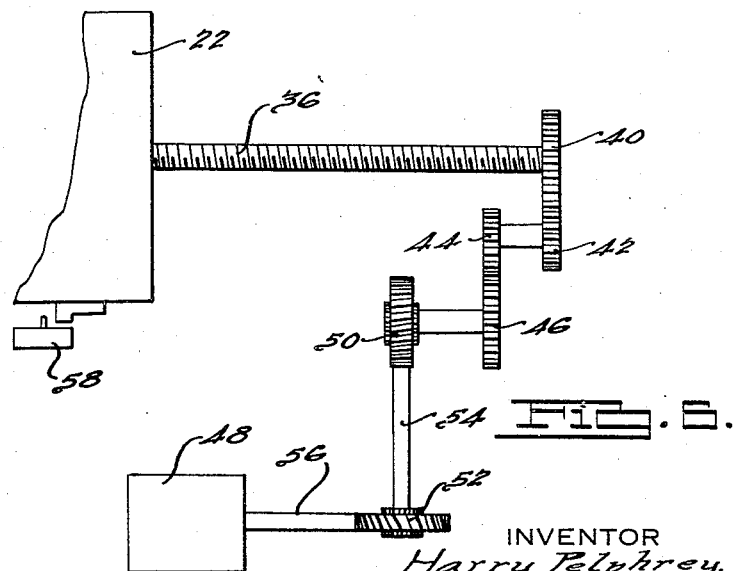

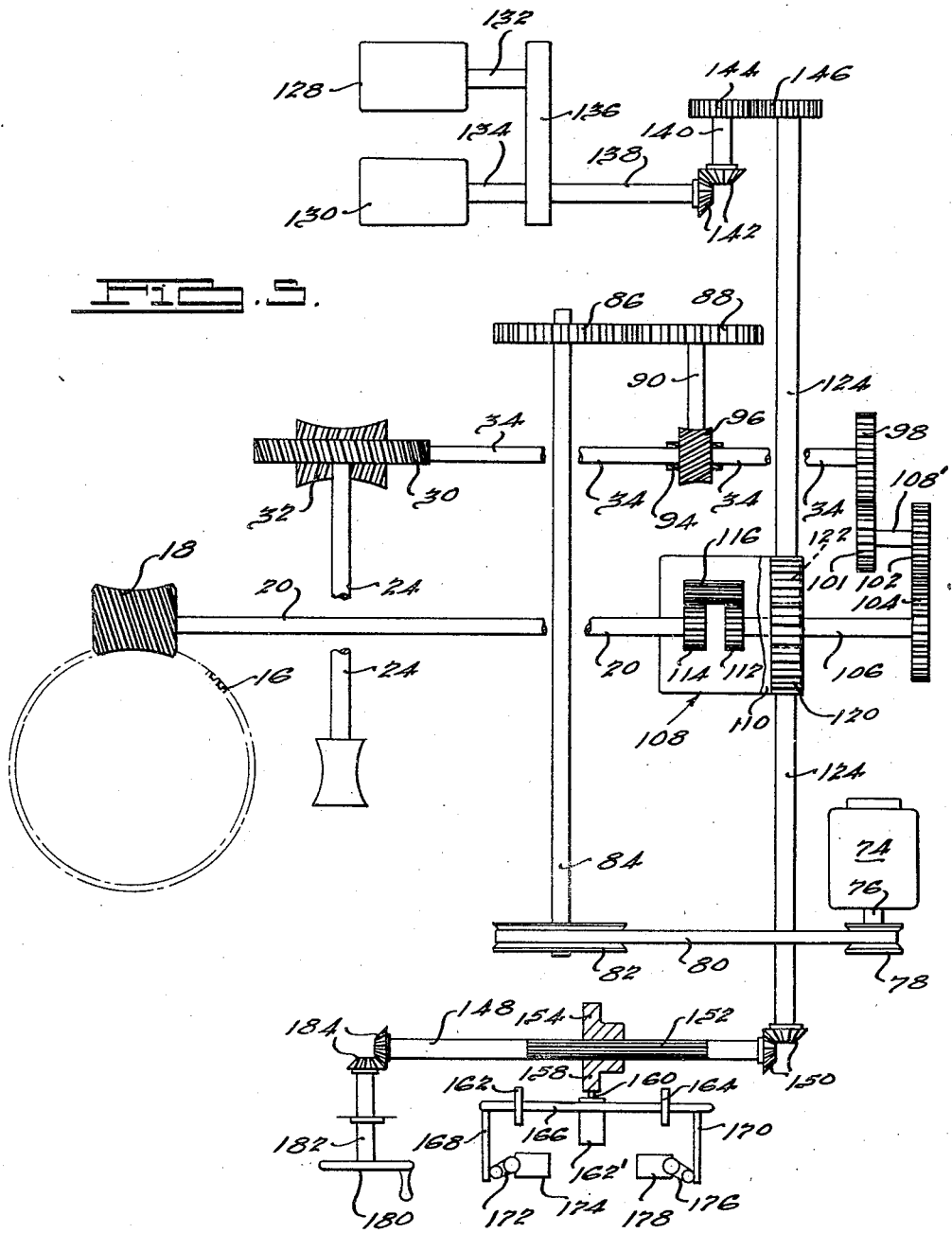

April 29, 1947.  H. PELPHREY  2,419,726
AUTOMATIC WORM GEAR HOBBING MACHINE
Filed March 21, 1942  6 Sheets-Sheet 6

SELECTOR SW TARGET.

| POSITION | A1 | A2 | B1 | B2 |
|---|---|---|---|---|
| NORMAL | X | O | O | X |
| FEED RIGHT | O | X | O | X |
| FEED LEFT | X | O | X | O |

X—CLOSED
O—OPEN

FIG. 8.

SELECTOR SW TARGET

| POSITION | C | D | E1 | E2 |
|---|---|---|---|---|
| OFF | O | O | X | O |
| INFEED | X | O | O | X |
| AUTO | X | X | X | O |

FIG. 9.

TIMER TARGET

| SEQUENCE | T | T1 | T2 |
|---|---|---|---|
| POWER OFF | O | O | X |
| INIT. CIR. CLOSED | X | O | X |
| TIMING | X | O | X |
| TIMED OUT | O | X | O |

FIG. 10.

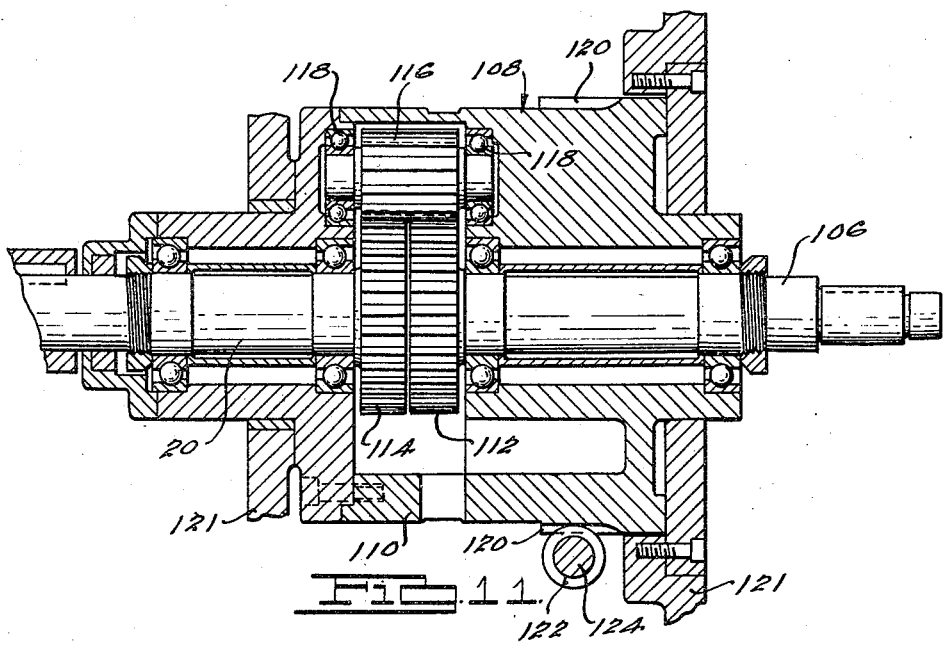

FIG. 11.

INVENTOR
Harry Pelphrey.
BY
Harness, Dickey & Pierce.
ATTORNEYS.

Patented Apr. 29, 1947

2,419,726

UNITED STATES PATENT OFFICE 2,419,726

AUTOMATIC WORM GEAR HOBBING MACHINE

Harry Pelphrey, Detroit, Mich., assignor to Michigan Tool Company, Detroit, Mich., a corporation of Delaware Application March 21, 1942, Serial No. 435,649

22 Claims. (Cl. 90—4)

The present invention relates to improvements in machines for accurately forming worm gear elements.

The present invention relates particularly to improvements in machines for forming worm gearing of the globoidal type, such type of gear elements, methods of producing the same, and type of cutters for producing the same having been disclosed and claimed in certain of the Cone Patents Nos. 1,683,163, 1,751,540, 1,822,800, 1,885,686, and 2,026,215.

The primary objects of the present invention are to provide improvements in machines of the type mentioned in which the operation of the machine is fully automatic in which the gear elements produced are accurate, and by which such gear elements may be economically produced.

A further object of the present invention is to provide improvements in machines of the type mentioned on which gear elements of various sizes may be produced.

Another object of the invention is to provide improvements in machines of the type mentioned in which, in the event of stoppage for any reason, the operation of the machine can be resumed again and the work finished without scrapping such work which may have been only partially formed. As a result of this, many of the expensive and complicated features which are required in other machines may be dispensed with, such as auxiliary D. C. power supply and control as an insurance against power failure, special means to prevent misalignment of the superstructure of the machine caused by heat and air conditioning means.

A further object of the invention is to provide improvements in machines of the type mentioned in which the construction is rigid, which is necessary in that the tools cut the full depth and cut more than one tooth at a time; also, to keep the cutting tools from overdriving the work ahead of the true indexing of the ratio gear train.

Other objects of the invention will become apparent from the following specification, the drawings relating thereto and from the claims hereinafter set forth.

In the drawings, in which like numerals are used to designate like parts in the several views throughout:

Figure 1 is a perspective view of a machine embodying features of the present invention;

Fig. 2 is a side elevational view of the machine shown in Fig. 1, but with the gear and worm removed and showing the slide in a forwardly position;

Fig. 3 is a top plan view of the machine shown in Fig. 2;

Fig. 4 is a front elevational view of the machine shown in Fig. 2;

Fig. 5 is a diagrammatic view illustrating the essential driving elements for the main drive and side feed;

Fig. 6 is a diagrammatic view showing the essential elements for the infeed;

Fig. 7 is a line diagram of the electric controls for the machine;

Figs. 8, 9, and 10 are charts for reference to the line diagram of Figure 7 and to illustrate certain switch settings for different operations of the machine; and Fig. 11 is a cross-sectional view illustrating the details of the matching-differential employed in the present invention; and Fig. 12 is a diagrammatic view of the switches or relays which are schematically illustrated in Figure 7. In Figure 12 the coils and the contacts operated thereby are shown together, whereas in Fig. 7, to simplify the drawing, such coils and contacts are shown separately from each other. The coils and the corresponding contacts are given the same reference characters in Figures 7 and 12, and corresponding coils and contacts are horizontally aligned in the two figures.

Prior to the present invention, in the formation of globoidal worm gear elements of different sizes, or of different center diameter, it has been the practice to produce such elements on general purpose equipment. To obtain the side feed action, a fixture was mounted on a work table with a screw adjustment which had to be turned while revolving. This was both slow and dangerous. In certain of the prior machines, the side feed operation was done by a hand crank which retained the human element, and tooth sizing had to be watched very carefully. This was disadvantageous because the operator often fed the cut too fast or too slow and tools were quite often broken. Furthermore, each machine demanded the constant attention of the operator so that an operator could operate only one machine.

According to the present invention, a machine is provided in which all of the operations are automatically governed and the machine requires no attention of the operator from the beginning of the in-feed motion to the termination of the complete operating cycle. In the machine of the present invention, the working spindles are at a right angle to each other. The gear to be generated is placed on the vertical work spindle, or work table, and the hob is mounted on the horizontal spindle, or hob spindle. However, in the cause of generating the worm, the worm blank is mounted in place of the hob on the horizontal spindle and the cutter is mounted on the vertical spindle in place of the gear.

The operation of the machine is so controlled that a predetermined in-feed is first accomplished and at the end of such in-feed, the side feed is imparted. Such side feed is accomplished by varying the relative rotative speeds of the vertical spindle and the horizontal spindle. It will be obvious that when such relative speed is increased, a side feed will result in one direction, while if the relative speed is decreased from a normal relative speed, the side feed is in the opposite direction. The cutter is of a width less than the normal width of the teeth so that as a result of the in-feed the entire interdental space between the teeth to be formed is not removed. The accurate formation of the tooth form results from the side feed.

In the side feed, the feed is first in one direction, from a normally central position, at a relatively low rate of speed. At the end of the side feed in that direction, there is a dwell in the side feed so as to accurately form the tooth completely around the gear element. At the end of the dwell, the cutter is returned to the normally central position at a higher rate of speed during which time no cutting takes place, and the side feed then continues in the opposite direction to cut at the slower rate of the speed. At the end of the side feed in the opposite direction, another dwell occurs; and, after the dwell, the tool returns to its normally central position during which time no cutting takes place. This completes the cycle of operation and results in the complete formation of the gear element, either the worm or the worm gear.

The side feed motion is powered by two brake motors, connected to a planetary gear train so that the operation of one motor moves the side feed at the high speed while the operation of the other motor moves it at the low speed.

The above operations are automatically accomplished through an electric control set up and the control is so constructed that by hand setting a portion of the cycle only may be practiced. Also, the cycle may be stopped at any point and continued without injury or loss in the work.

Referring to the drawings, an automatically controlled machine for forming globoidal worm gear elements is illustrated which comprises a base 10 which is formed of a heavy metal casting. The base 10 serves to mount a vertical work spindle 12 upon which the gear to be generated is mounted, or upon which a circular cutter for generating the worm is mounted. In the embodiment illustrated a gear 14 is illustrated as being mounted on the spindle 12. The gear 14 or the cutter may be suitably secured to the spindle 12 for rotation therewith.

The vertical spindle 12 is driven through a high ratio, self locking globoidal drive with minimum back lash, such drive being shown in Figure 5 with the worm wheel indicated at 16 and the worm at 18. The wheel 16 is, of course, co-axial with the spindle 12 and is suitably connected thereto for driving the spindle. A shaft 20 is fixed to the worm 18 for driving the worm, and the shaft 20 is driven in a manner that will be described in detail hereinafter.

A slide 22 is slidably mounted on horizontal, parallel ways formed in the top surface of the base 10 so that such slide 22 is slidable on parallel lines toward and from the vertical spindle 12. The slide 22 serves to mount a horizontal work spindle 24 upon which is mounted the worm blank or the hob. In the embodiment illustrated a hob 26 is shown as mounted upon the horizontal work spindle for cutting the gear 14. The hob 26 is of the type disclosed in the Cone Patent No. 2,026,215 and has cutting edges which are of less width than the interdental space between the teeth of the finished gear 14. One end of the hob is supported in the head stock mounted on the slide 22 and the other end is mounted on the removable tail stock 28 which may be removed for the purpose of mounting the hob or worm blank on the horizontal spindle.

The horizontal spindle is diagrammatically indicated by the shaft 24 in Fig. 5, and is driven by the worm gear 30 and worm 32. The worm gear elements 30 and 32 are of the globoidal type using a high ratio, self-locking drive with minimum back lash. The worm 32 is fixed to a drive shaft 34 and is driven thereby. The drive connections for the shaft 34 will be described in detail hereinafter.

The in-feed of the cutter or hob with respect to the work is accomplished by moving the slide 22 toward the vertical spindle 12. In order to so move the slide a screw shaft 36 has the forward end thereof connected to a threaded portion of the slide 22 so that upon rotation of the screw 36 the slide 22 is caused to slide upon the horizontal ways on the base 10. The opposite end of the screw 36 is suitably mounted within an upstanding housing portion 38 which is fixed to and forms a part of the base 10.

The drive for rotating the shaft 36 to slide the member 22 is indicated in Fig. 6, and such drive includes a set of change gears 40, 42, 44, and 46, which are operatively connected to a driving motor or in-feed motor 48 through sets of globoidal worm gears 50 and 52 and shaft connections 54 and 56. The motor 48 is an electric brake motor of the conventional type having a magnetic and spring urged brake which automatically engages the driving shaft 56 when the flow of current is cut off from the motor so that the drive is instantly stopped.

In order to control the stopping of the motor 48 so as to stop the in-feed at the proper time, limit switches 58 and 60 are provided. Limit switch 58 is mounted upon the base 10 adjacent one side of the slide 22, and the projecting or actuating finger 62 of the switch is disposed in the path of movement of an adjustable stop 64 which is adjustably mounted on a slide bar 66 which is mounted on the slide 22 for movement therewith. Thus, by setting the slide 64 at a proper position on the rod 66 when the stop 64 reaches a predetermined position it engages the fingers 62 to actuate the switch 58.

The other switch 60 is actuated by a dog-like member 70 having a radially projecting finger. Such dog 70 is fixed to the screw shaft adjacent the forward face of the upstanding portion 38 of the base 10, so that the dog 70 rotates with the in-feed screw shaft 36. The switch 60 has a depending actuating finger 72 which is disposed in the path of movement of the dog 70 so that upon each rotation of the shaft 36 and, consequently, each rotation of the dog 70 the finger 72 is engaged and actuated by the dog and the switch 60 is opened. Such switch returns to its closed position as soon as it is disengaged by the member 70.

The circuit for the switches 58 and 60, which will be described in detail hereinafter, is such that the infeed motor 48 will not be stopped until both of the switches 58 and 60 are actuated at the same time. The two switches provide a very accurate stop for the in-feed because the in-feed for each rotation of the screw 36 is slight, and the switch 60 is actuated for each of such slight inward movements of the slide 22. The in-feed may thus be set and the stop 64 adjusted in close proximity to the proper stop position. Thus, while the dog 70 actuates the switch 60 for each rotation, it is not effective to stop the in-feed motor until the switch 58 is actuated by the stop 64. When the stop 64 engages the finger 62 and when, at the same time the member 70 engages the actuating finger of the switch 60, the switches 58 and 60 are opened to break the circuit to the motor 48 and thus instantly stop the in-feed.

As stated above, the vertical and horizontal spindles are driven in synchronism and the side feed is accomplished by varying the relative rotative speeds of the vertical and horizontal spindles. Means are provided directly in the main drive for the vertical spindle for varying the rotative speed of such spindle, while the drive for the horizontal spindle remains unaffected, so that by varying the speed of one of the spindles while both of the spindles are driven in synchronism it will be appreciated that the relative speeds between the spindles is varied. The effect of this is to side feed the cutting tool in either direction, depending upon whether the speed of the vertical spindle is reduced or increased.

The main drive for the spindles comprises an electric motor 74 having a pulley shaft 76 on which a pulley 78 is mounted. The pulley 78 is connected through a belt 80 with another pulley 82 to which a shaft 84 is connected. The shaft 84 has a gear 86 mounted thereon which meshes with another gear 88. Such gear 88 is keyed to a shaft 90, and the shaft 90 drives the shaft 34 through a globoidal worm gear set, including a worm 94 mounted on the shaft 90 and a worm gear 96 keyed to the shaft 34 intermediate the ends thereof. The shaft 34 has the worm 32 keyed thereto and serves to drive the worm gear 30, which, in turn, drives the horizontal spindle 24.

The opposite end of shaft 34 is connected through change gears 98, 101, 102 and 104 with shaft 106. The gears 101 and 102 are both mounted upon shaft 108'. The shaft 106 is connected to the shaft 20 for driving such shaft 20 through a matching differential, generally indicated at 108.

The matching differential 108 serves to provide the means for varying the speed of the vertical spindle 12 in order to obtain the side feed.

Such matching differential is illustrated in detail in Figure 11, and includes a cylindrical housing or rotatable drum 110 into which the aligned shafts 106 and 20 extend. The housing 110 is mounted for rotation within suitable bearings mounted upon upstanding wall portions 121 of the base 10, forward of the wall portion 38. The housing 110 may thus be revolved about the axis of shafts 106 and 20.

The shafts 106 and 20 project within the housing 110; and a gear 112 is keyed to the inner end of shaft 106 and another gear 114 is keyed to the inner end of shaft 20. An idler gear 116 is fixed to the housing 110 by means of bearings 118, so that the gear 116 meshes with the gears 112 and 114 and is free to rotate about its own axis but revolves about gears 112 and 114 when the housing 110 is revolved. The gears 112 and 114 have the same outside diameter, but the gear 114 has less teeth than the gear 112. For example, the gear 112 may have twenty-four teeth, the gear 116 thirteen teeth, and the gear 114 twenty-three teeth. The gear center distances for the gears 112 and 114 with respect to the gear 116 are the same. The twenty-four tooth gear may be made standard, while the twenty-three tooth gear is cut to mate with the thirteen tooth gear. All geometric laws of the involute curve are strictly observed in the formation of these gear teeth.

This construction of the matching differential 108 thus provides a great gear reduction within itself for the side feed mechanism, as one turn of the housing or drum 110 rotates gear 114 one twenty-third of a revolution. Thus, it is possible through this means to accomplish the relatively small side feed action directly through the main drive in a very accurate manner.

This side feed is thus accomplished by rotating the housing 110. In order to rotate the housing 110, such housing is formed with a ring of worm gear teeth 120 therearound which meshes with a worm 122. Such worm 122 is keyed to shaft 124 intermediate the ends thereof.

At the termination of the in-feed, the cutter is disposed substantially midway or centrally between the flanks of adjacent teeth on the element being cut. The side feed is first in one direction at a relatively low speed to cut one of the flanks and, after the dwell, the return to the central position is at a relatively high speed. The feed then continues in the opposite direction at a relatively low speed and, after the dwell, in returning to the central position the return is at a high speed. In order to accomplish such side feed motions a low speed motor 128 and a higher speed motor 130 are provided. Such motors are of conventional construction, are reversible, and are provided with automatic brake means which include a magnetic brake which engages the motor shaft to stop the same when the current to the motor is cut off.

The motor 128 is provided with a motor shaft 132; and motor 130 is provided with a motor shaft 134. The shafts 132 and 134 are connected through a planetary differential indicated at 136 with a shaft 138. When the low speed motor 128 is operating the shaft 138 will be driven through the planetary differential 136 at a relatively low speed. When the motor 130 is actuated the shaft 138 is driven through the planetary differential 136 at a relatively high speed. The shaft 138 is connected to a shaft 140 through bevel gears 142. The shaft 140 has a gear 144 keyed thereto which meshes with a gear 146 keyed to one end of the shaft 124.

The shaft 124 also drives another shaft 148 through bevel gears 150 and such shaft 148 is provided with a screw threaded portion 152 intermediate the ends thereof. A travelling nut 154 is disposed on the threaded portion 152 and is prevented from turning by means of bars 156 (Fig. 2) mounted on the base 10 which engage lateral projections formed on the nut 154. Thus, as the shaft 148 is turned the nut 154 is caused to travel along the threaded portion 152 in a direction depending upon the direction of rotation of the shaft 148.

The nut 154 is formed with a depending projection 158 which is adapted to engage an upstanding finger 160 of a central limit switch 162', at the central position of its travel which corresponds to the central position of the cutter. As the nut travels toward each end it is adapted to abut against stops 162 and 164 which are adjustably mounted on an actuating rod 166. Such rod is movable and is pivotally connected to depending levers 168 and 170 which are pivotally mounted intermediate the ends thereof to the base 10, as shown in Figs. 1 and 2.

As the projection 158 moves into engagement with the stop 162 it will be seen that the lever 168 is pivoted to actuate a pivoted arm 172 of a limit switch 174 to open such switch 174. In moving in the opposite direction the projection 158 engages the stop 164 to pivot the arm 170 to thereby move the pivoted actuating arm 176 of a limit switch 178 to open such switch. The limit switches 162', 174, and 178 are connected in such a circuit as to control the operation of the side feed motors. Such circuit will be described in detail hereinafter.

In order to obtain a hand side feed, a hand wheel 180 is mounted on a shaft 182 which in turn is mounted upon the base 10. The inner end of such shaft is connected through bevel gears 184 with the shaft 148.

The elements above described constitute the essential mechanical elements of the machine. The shafts are, of course, mounted in suitable bearings provided on the base 10 and the details of construction for providing such bearings and for mounting the motors and switches are matters of mechanical design and are within the knowledge of the skilled mechanic in the art to which the present invention is directed.

As stated above, the cycle of operation of the main motor, the in-feed motor and the side feed motor is controlled through an electric control system shown in Fig. 7.

Figs. 8, 9 and 10 indicate charts showing settings for the selector targets and the timer target. Such charts refer to settings for the hand switches A1, A2, B1, B2, C, D1, E1, and E2. Such switches are also indicated in Fig. 7. In the charts the character X represents the switches as being closed, and the character O represents the switches as being open. By reference to the charts for the various operations indicated on the charts, the proper settings of these switches may be made. Switches T, T1, and T2 are mechanical switches which are automatically actuated depending upon the settings of the hand switches.

The motors 74, 48, 130 and 128 are connected to the main or primary line 200, as indicated. Such main line is connected to the source through a switch 201 which may be closed to supply current to the line 200. The electric energy from the primary circuit is passed to the secondary circuit through the transformer 202.

A starter button may be pressed to close the starter switch 204 which energizes the main motor starter relay M, or coil M, and such coil M remains energized until the stop switch 206 is opened by pressing a stop button, or a voltage failure or overload occurs, or until a complete cycle is terminated.

When the coil M is energized, the contacts Ma, Mb and Mc, which are normally open, are closed, thus energizing the main drive motor 74.

With the conventional selector switch set at automatic, switches C, D1 and E1 are closed and switch E2 is open, with that setting of the selector switch. Upon closing the starter switch 204, the in-feed coil or relay IF is energized. Contact IFa, which is normally closed, is thus automatically opened; and contacts IFb, IFc, IFd, IFe and IFg, which are normally open, are automatically closed. The in-feed motor 48 is thus energized when contacts IFc, IFd and IFe close, and the in-feed starts and causes slide 22 carrying the hob 26 or the worm blank to move radially toward the axis of the worm gear 14 or the cutter. This is accomplished by turning the screw shaft 36 through the mechanism shown in Fig. 6. Limit switches 60 and 58 are normally closed, and for each revolution of the shaft 36 the limit switch 60 is opened. However, the limit switch 58 remains closed, until it is engaged at the limit of in-feed by the stop 64, to keep the coil IF energized. When the limit switch 58 is opened at the limit of in-feed by stop 64, it is held open and the next time around that the dog 70 engages the finger 72 the switch 60 is opened. There is, of course, very little time lapse from the time the switch 58 is opened that switch 60 is opened. When the switches 58 and 60 are opened at the same time or simultaneously, it will be seen that the coil IF is de-energized and contacts IFb, IFc, IFd, IFe and IFg automatically open. The motor 48 instantly stops and the magnetic brake of the motor is automatically set to instantly stop the in-feed.

When coil IF is de-energized, contact IFa automatically closes.

During the time that IF is energized, control relay or coil CR1 is energized through B2 and IFg. CR1 then establishes its own holding circuit through CR1a, which is automatically closed when CR1 is energized. CR1b is also closed; and CR1c, which is normally closed, is opened. When IF is de-energized, CR1 remains energized through CR1a, CR2c, and limit switch 174 at point 208. IFa closes, and the circuit for coil LR is completed through CR3c, CR1b, CR2c and limit switch 174 at point 208. Relay or coil LR is then energized, and this causes side feed to the right at the lower or cutting speed.

When LR is energized, contacts LRa, LRb and LRc, which are normally open, are automatically closed to rotate the motor 128 in one direction to thereby cause the side feed to the right. At the right limit of travel, limit switch 174 is engaged to open the circuit at the point 208 and close the circuit at the point 210. With the circuit open at point 208, the coils CR1 and LR are de-energized. When LR is de-energized, contacts LRa, LRb and LRc automatically open, thus stopping the motor 128 and automatically setting the magnetic brake of such motor.

When switch 174 is actuated, the circuit is closed at 210 to energize the timer clutch 212. The energization of the timer clutch 212 mechanically closes the mechanically actuated switch T, and when switch T is closed the timer motor 214 operates. Energization of the timer clutch 212 also mechanically opens mechanical switch T2, which is normally closed. During operation of the timer motor 214, the dwell occurs. Mechanical switch T1 is mechanically operated by the timer motor 214 after a predetermined dwell to close T1.

Limit switch 162 is closed at all positions of side feed except center position when it is engaged by stop 158 and opened. The closing of contact T1 is delayed by the timer motor, as stated above, and when it is closed the control relay or coil CR4 is energized and establishes its own holding circuit through contact CR4a. When coil CR4 is energized, contact CR4b is automatically closed, energizing coil CR3. When relay or coil CR3 is energized, contacts CR3a and CR3b, which are normally open, are closed; and CR3c and CR3d, which are normally closed, are open. When relay or coil CR2 is energized, contacts CR2a and CR2b, which are normally open, are automatically closed; and contact CR2c, which is normally closed, is open. CR3e and CR3f, which are normally open, are closed when CR3 is energized. Since CR2c is open when CR2 is energized, HR is not energized and CR1 is not energized also. When CR1 is not energized, CR1c is normally closed so that relay HL is energized through CR2b and CR3b and limit switch 178 at point 216. Relay LL is not energized because CR3 is energized and CR3d, which is normally closed, is open. When HL is energized, HLa, which is normally closed, is open.

Also, when HL is energized, HLb, HLc and HLd, which are normally open, are closed to operate the high speed side feed motor 130 to move the side feed to the left at the higher rate of speed. This gives the quick return to the central position.

Limit switch 162', which is closed at all positions except center, is engaged by the traveling nut 154 when it reaches its central position to open limit switch 162'. CR4 is thus de-energized, which causes contacts CR4a and CR4b to open. When CR4b opens, CR3 is de-energized, which causes CR3b to open, thereby de-energizing coil HL. When HL is de-energized, contact HLa, which has been held open during energization of HL, closes; and contact CR3d closes when CR3 is de-energized, so that coil LL is thereby energized through IFa, HLa, CR3d, CR1c, and limit switch 178 at point 216.

When HL is de-energized, contacts HLb, HLc and HLd open to stop the motor 130, at which time the magnetic brake of the motor is automatically set.

With relay or coil LL energized, contacts LLa, LLb and LLc, which are normally open, are closed to actuate the slow speed side feed motor 128 in such a direction as to continue the side feed to the left at the lower or cutting speed. During such side feed to the left the traveling nut moves to engage the stop 164 at its limit of movement, and actuates the limit switch 178 to open the circuit at point 216 and to close the circuit at point 218.

When the circuit is opened at 216, coil LL is de-energized, which causes the contacts LLa, LLb and LLc to open, thereby stopping the motor 128 and automatically setting the magnetic brake to instantly stop the side feed.

When limit switch 178 is actuated, the circuit at 218 is closed to energize the timer clutch 212 and effect operation of the timer motor 214 to thereby obtain the dwell at the end of the side feed in the same manner as described above when the limit switch 174 closes the circuit at point 210.

When limit switch 178 is opened at 216, CR2 is de-energized so that CR2b is opened and coil HL is de-energized.

After an interval of operation of the timer motor, relay or coil CR4 is energized through T1 and establishes its self-holding circuit through CR4a. Contact CR4b is closed, thereby energizing coil CR3. Contact CR3e is likewise closed, energizing coil CR1 through normally closed contacts CR2c and limit switch 174 at point 208. When coil CR1 is energized, contact CR1b is closed; and when CR3 is energized, contact CR3c is open and contact CR3f is closed. Relay or coil HR is thereby energized.

When coil HR is energized, contacts HRa, HRb and HRc are closed to operate the high speed side feed motor 130 in such a direction to cause movement to the right at the higher rate of speed. When HR is energized, contact HRe is closed to energize CR3. When the travel nut 154 reaches its central position, it engages the limit switch 162' to open such switch and de-energize coil CR4. When CR4 is de-energized, contacts Ma, Mb and Mc are open to break the circuit to the main drive motor 74 and stop the machine at the termination of the complete cycle.

The above description is directed to a completely automatic cycle of the machine. A selector switch is diagrammatically indicated in Fig. 9, and is provided with positions labeled "Automatic," giving the operation described above, "In-feed," giving no side feed, and "Off," giving no feed at all.

For the "off" position, switches C, D1, and E2 are open so that there can be no in-feed or side feed. Switch E1 is closed so that the main drive motor will continue to operate.

For the in-feed only switches C and E2 are closed but switches D1 and E1 are open. The in-feed cycle may thereby be maintained but the side feed operations will not occur.

Another selector switch is provided which is indicated in Fig. 8. Such switch is labeled "Normal," giving the side feed cycle described, and is also "Feed-right" and "Feed-left." With this selector switch in the "feed-right" position the engagement of limit switch 162 during the high speed left side feed motion de-energizes CR4 and M, terminating the complete cycle at this point. In the "feed-left" position, IF energizes CR2 instead of CR1; and side feed left follows after the completion of the in-feed, the sequence being similar to the normal sequence described from that point on.

A side feed button 220 is provided to re-start the side feed if for any reason it is interrupted.

Also, a pump motor 222 is provided and is connected through the usual conduits for supplying the cutting fluid in the usual way.

It is not believed that it is necessary to trace the circuit through all of the various settings of the switches shown in Figs. 8, 9, and 10 since the description for the automatic cycle will be sufficient for an understanding of the other cycles for the various settings of the switches.

From the above description of the automatic cycle it will be understood that the normally open contacts are illustrated by the spaced parallel lines, and the normally closed contacts are illustrated by the spaced parallel lines having a cross line passing through the spaced parallel lines. Energization of the various coils closes their respective normally open contacts and opens their respective normally closed contacts, such contacts being connected to their respective coils in the usual way. The contacts for the various coils or relays are indicated by sub-letters. The elements employed in the electric control circuit are conventional elements obtainable on the market and their structures are familiar to those skilled in the art.

What is claimed is:

1. A machine for cutting worm elements comprising a work spindle for driving a worm element, a tool spindle disposed in spaced relation to said element and adapted to mount a tool having cutting edges narrower than full mating width, means for rotating said work spindle, means for rotating said tool spindle, power means for moving said spindles radially with respect to each other to effect an infeed of said tool, power means operable after the completion of the infeed for modifying the rotative speed of one of said spindles to effect side feed of said tool, and electrically controlled means for controlling the operation of both of said power means in succession.

2. A machine for cutting worm elements comprising a work spindle for driving a worm element, a tool spindle disposed in spaced relation to said element and adapted to mount a tool having cutting edges narrower than full mating width, means for rotating said work spindle, means for rotating said tool spindle, power means for moving said spindles radially with respect to each other to effect an infeed of said tool, power means operable after the completion of the infeed for modifying the rotative speed of one of said spindles to effect side feed of said tool, and electrically controlled means for controlling the operation of both of said power means in succession, said last named means including means for controlling said second named power means to effect said side feed first in one direction and then in the opposite direction.

3. A machine for cutting worm elements comprising a work spindle for driving a worm element, a tool spindle disposed in spaced relation to said element and adapted to mount a tool having cutting edges narrower than full mating width, means for rotating said work spindle, means for rotating said tool spindle, power means for moving said spindles radially with respect to each other to effect an infeed of said tool, power means operable after the completion of the infeed for modifying the rotative speed of one of said spindles to effect side feed first in one direction and then in the opposite direction, and electrically controlled means for controlling the operation of both of said power means in succession, said last named means including means for effecting said side feed first in one direction and then in the opposite direction with a dwell at the end of the side feed in both directions of the side feed.

4. A machine for cutting worm elements comprising a work spindle for driving a worm element, a tool spindle disposed in spaced relation to said element and adapted to mount a tool having cutting edges narrower than full mating width, means for rotating said work spindle, means for rotating said tool spindle, power means for moving said spindles radially with respect to each other to effect an infeed of said tool, power means operable after the completion of the infeed for modifying the rotative speed of one of said spindles to effect side feed, and electrically controlled means for controlling the operation of both of said power means in succession, said last named means including means for effecting said side feed from a central position first in one direction, then reversing back to the central position, then continuing in the reversed direction, and then back to the central position.

5. A machine for cutting worm elements comprising a work spindle for driving a worm element, a tool spindle disposed in spaced relation to said element and adapted to mount a tool having cutting edges narrower than full mating width, means for rotating said work spindle, means for rotating said tool spindle, power means for moving said spindles radially with respect to each other to effect an infeed of said tool, power means operable after the completion of the infeed for modifying the rotative speed of one of said spindles to effect side feed of said tool, and electrically controlled means for controlling the operation of both of said power means in succession, said last named means including means for effecting said side feed from a central position first in one direction, then dwelling, then reversing back to the central position, then continuing in the reversed direction, then dwelling, and then back to the central position.

6. A machine for cutting worm elements comprising a work spindle for driving a worm element, a tool spindle disposed in spaced relation to said element and adapted to mount a tool having cutting edges narrower than full mating width, means for rotating said work spindle, means for rotating said tool spindle, power means for moving said spindles radially with respect to each other to effect an infeed of said tool, power means operable after the completion of the infeed for modifying the rotative speed of one of said spindles to effect side feed of said tool, and electrically controlled means for controlling the operation of both of said power means in succession, said last named means including means for first effecting a predetermined infeed of said tool and then for effecting said side feed first in one direction and then in the opposite direction.

7. A machine for cutting worm elements comprising a work spindle for driving a worm element, a tool spindle disposed in spaced relation to said element and adapted to mount a tool having cutting edges narrower than full mating width, means for rotating said work spindle, means for rotating said tool spindle, power means for moving said spindles radially with respect to each other to effect an infeed of said tool, power means operable after the completion of the infeed for modifying the rotative speed of one of said spindles to effect side feed of said tool, and electrically controlled means for controlling the operation of both of said power means in succession, said last named means including means for first effecting a predetermined infeed of said tool and for then effecting said side feed from a central position first in one direction, then reversing back to the central position, then continuing in the reversed direction, and then back to the central position.

8. A machine for cutting worm elements comprising a work spindle for driving a worm element, a tool spindle disposed in spaced relation to said element and adapted to mount a tool having cutting edges narrower than full mating width, means for rotating said work spindle, means for rotating said tool spindle, power means for moving said spindles radially with respect to each other to effect an infeed of said tool, power means operable after the completion of the infeed for modifying the rotative speed of one of said spindles to effect side feed of said tool, and electrically controlled means for controlling the operation of both of said power means in succession, said last named means including means for effecting a predetermined infeed and then for effecting said side feed from a central position first in one direction, then dwelling, then reversing back to the central position, then continuing in the reversed direction, then dwelling, and then back to the central position.

9. A machine for cutting worm elements comprising a work spindle for driving a worm element, a tool spindle disposed in spaced relation to said element and adapted to mount a tool having cutting edges narrower than full mating width, means for rotating said work spindle, means for rotating said tool spindle, power means for moving said spindles radially with respect to each other to effect an infeed of said tool, power means operable after the completion of the infeed for modifying the rotative speed of one of said spindles to effect side feed of said tool, and electrically controlled means for controlling the operation of both of said power means in succession, said last named means including means for effecting said side feed from a central position first in one direction at one rate of speed, then reversing back to the central position at an increased rate of speed, then continuing in the reversed direction at said first named rate of speed, and then back to the central position at said increased rate of speed.

10. A machine for cutting worm elements comprising a work spindle for driving a worm element, a tool spindle disposed in spaced relation to said element and adapted to mount a tool having cutting edges narrower than full mating width, means for rotating said work spindle, means for rotating said tool spindle, power means for moving said spindles radially with respect to each other to effect an infeed of said tool, power means operable after the completion of the infeed for modifying the rotative speed of one of said spindles to effect side feed of said tool, and electrically controlled means for controlling the operation of both of said power means in succession, said last named means including means for effecting a predetermined infeed of said tool and for then effecting said side feed from a central position first in one direction at one rate of speed, then reversing back to the central position at an increased rate of speed, then continuing in the reversed direction at said first named rate of speed, and then back to the central position at said increased rate of speed.

11. A machine for cutting worm elements comprising a work spindle for driving a worm element, a tool spindle disposed in spaced relation to said element and adapted to mount a tool having cutting edges narrower than full mating width, means for rotating said work spindle, means for rotating said tool spindle, power means for moving said spindles radially with respect to each other to effect an infeed of said tool, power means operable after the completion of the infeed for modifying the rotative speed of one of said spindles to effect side feed of said tool, and electrically controlled means for controlling the operation of both of said power means in succession, said last named means including means for effecting said side feed from a central position first in one direction at one rate of speed, then dwelling a predetermined length of time, then reversing back to the central position at an increased rate of speed, then continuing in the reversed direction at the first named rate of speed, then dwelling for a predetermined length of time, and then back to the central position at said increased rate of speed.

12. A machine for cutting worm elements comprising a work spindle for driving a worm element, a tool spindle disposed in spaced relation to said element and adapted to mount a tool having cutting edges narrower then full mating width, means for rotating said work spindle, means for rotating said tool spindle, power means for moving said spindles radially with respect to each other to effect an infeed of said tool, power means operable after the completion of the infeed for modifying the rotative speed of one of said spindles to effect side feed of said tool, and electrically controlled means for controlling the operation of both of said power means in succession, said last named means including means for effecting a predetermined infeed and for effecting said side feed from a central position first in one direction at one rate of speed, then dwelling a predetermined length of time, then reversing back to the central position at an increased rate of speed, then continuing in the reversed direction at the first named rate of speed, then dwelling for a predetermined length of time, and then back to the central position at said increased rate of speed.

13. A machine for cutting gear elements comprising a work spindle for driving a gear element, a tool spindle disposed in spaced relation to said element and adapted to mount a tool, means for rotating said work spindle, means for rotating said tool spindle, power means for moving said spindles radially with respect to each other to effect an infeed of said tool, said last named means including a slidable element mounting one of said spindles, and a rotating screw operatively connected to said sliding element for moving said slidable element to effect said infeed, and electrically controlled means for controlling the operation of said power means, said last named means including a pair of switch elements, means mounted on said rotating screw element for rotation therewith to actuate one of said switches, and stop means associated with said slidable element to operate the other of said switches, and electric connections for said switches of such a construction that operation of said power means is stopped upon actuation of both of said switches.

14. A machine for cutting gear elements comprising a work spindle for driving a gear element, a tool spindle disposed in spaced relation to said element and adapted to mount a tool, means for rotating said work spindle, means for rotating said tool spindle, power means for moving said spindles radially with respect to each other to effect an infeed of said tool, said last named means including a slidable element mounting one of said spindles, and a rotating screw operatively connected to said sliding element for moving said slidable element to effect said infeed, and electrically controlled means for controlling the operation of said power means, said last named means including a pair of switch elements, means mounted on said rotating screw element for rotation therewith to actuate one of said switches upon each rotation of said screw element, and stop means associated with said slidable element to operate the other of said switches when said slidable element reaches a predetermined position, and electric connections for said switches of such a construction that operation of said power means is stopped upon actuation of both of said switches.

15. A machine for cutting gear elements comprising a work spindle for driving a gear element, a tool spindle disposed in spaced relation to said element and adapted to mount a tool, means for rotating said work spindle, means for rotating said tool spindle, power means for moving said spindles radially with respect to each other to effect an infeed of said tool, said last named means including a slidable element mounting one of said spindles, a rotating screw operatively connected to said sliding element for moving said element to effect said infeed, and an electric motor operatively connected to said screw for rotating the same and electrically controlled means for controlling the operation of said power means, said last named means including a pair of switch elements, means mounted on said rotating screw element for rotation therewith to actuate one of said switches upon each rotation of said screw element, and stop means associated with said slidable element to operate the other of said switches when said slidable element reaches a predetermined position, and electric connections for said switches of such a construction that operation of said electric motor is stopped upon actuation of both of said switches.

16. A machine for cutting worm elements comprising a work spindle for driving a worm element, a tool spindle disposed in spaced relation to said element and adapted to mount a tool having cutting edges narrower than full mating width, means for rotating said work spindle, means for rotating said tool spindle, power means for moving said spindles radially with respect to each other to effect an infeed of said tool, said last named means including a slidable element mounting one of said spindles, a rotating screw operatively connected to said sliding element for moving said slidable element to effect said infeed, an electric motor operatively connected to said screw for rotating the same and electrically controlled means for controlling the operation of said power means, said last named means including a pair of switch elements, means mounted on said rotating screw element for rotation therewith to actuate one of said switches upon each rotation of said screw element, and stop means associated with said slidable element to operate the other of said switches when said slidable element reaches a predetermined position, and electric connections for said switches of such a construction that operation of said electric motor is stopped upon actuation of both of said switches.

17. A machine for cutting worm elements comprising a work spindle for driving a worm element, a tool spindle disposed in spaced relation to said element and adapted to mount a tool having cutting edges narrower than the full mating width, means for rotating said work spindle, means for rotating said tool spindle, power means for moving said spindles radially with respect to each other to effect an infeed of said tool, said last named means including a slidable element mounting one of said spindles, a rotating screw operatively connected to said sliding element for moving said element to effect said infeed, and an electric motor operatively connected to said screw for rotating the same, and electrically controlled means for controlling the operation of said power means, said last named means including a pair of switch elements, means mounted on said rotating screw element for rotation therewith to actuate one of said switches upon each rotation of said screw element, and stop means associated with said slidable element to operate the other of said switches when said slidable element reaches a predetermined position, electric connections for said switches of such a construction that operation of said electric motor is stopped upon actuation of both of said switches, power means for modifying the rotative speed of one of said spindles to effect side feed of said tool and electrically controlled means for controlling the operation of said last named power means.

18. A machine for cutting worm elements comprising a work spindle for driving a worm element, a tool spindle disposed in spaced relation to said element and adapted to mount a tool having cutting edges narrower than the full mating width, means for rotating said work spindle, means for rotating said tool spindle, power means for moving said spindles radially with respect to each other to effect an infeed of said tool, said last named means including a slidable element mounting one of said spindles, a rotating screw operatively connected to said sliding element for moving said element to effect said infeed, and an electric motor operatively connected to said screw for rotating the same, and electrically controlled means for controlling the operation of said power means, said last named means including a pair of switch elements, means mounted on said rotating screw element for rotation therewith to actuate one of said switches upon each rotation of said screw element, and stop means associated with said slidable element to operate the other of said switches when said slidable element reaches a predetermined position, electric connections for said switches of such a construction that operation of said electric motor is stopped upon actuation of both of said switches, power means for modifying the rotative speed of one of said spindles to effect side feed of said tool and electrically controlled means for controlling the operation of said last named power means, said last named means including means for effecting said side feed from a central position first in one direction, then dwelling, then reversing back to the central position, then continuing in the reversed direction, then dwelling, and then back to the central position.

19. A machine for cutting worm elements comprising a work spindle for driving a worm element, a tool spindle disposed in spaced relation to said element and adapted to mount a tool having cutting edges narrower than the full mating width, means for rotating said work spindle, means for rotating said tool spindle, power means for moving said spindles radially with respect to each other to effect an infeed of said tool, said last named means including a slidable element mounting one of said spindles, a rotating screw operatively connected to said sliding element for moving said element to effect said infeed, and an electric motor operatively connected to said screw for rotating the same, and electrically controlled means for controlling the operation of said power means, said last named means including a pair of switch elements, means mounted on said rotating screw element for rotation therewith to actuate one of said switches upon each rotation of said screw element, and stop means associated with said slidable element to operate the other of said switches when said slidable element reaches a predetermined position, electric connections for said switches of such a construction that operation of said electric motor is stopped upon actuation of both of said switches, power means for modifying the rotative speed of one of said spindles to effect side feed of said tool and electrically controlled means for controlling the operation of said last named power means, said last named means including means for effecting said side feed from a central position first in one direction at one rate of speed, then dwelling a predetermined length of time, then reversing back to the central position at an increased rate of speed, then continuing in the reversed direction at the first named rate of speed, then dwelling for a predetermined length of time, and then back to the central position at said increased rate of speed.

20. A machine for cutting worm elements comprising a work spindle for driving a worm element, a tool spindle disposed in spaced relation to said element and adapted to mount a tool having cutting edges narrower than full mating width, means mounting said spindles at right angles to each other and movable with respect to each other to accommodate worm elements on different center distances, means for rotating said spindles in synchronism, power means for moving said spindles radially with respect to each other to effect an infeed of said tool, power means operable after the completion of the infeed for modifying the rotative speed of one of said spindles to effect side feed of said tool, and electrically controlled means for controlling the operation of both of said power means in succession.

21. A machine for cutting worm elements comprising a work spindle for driving a worm element, a tool spindle disposed in spaced relation to said element and adapted to mount a tool having cutting edges narrower than full mating width, means mounting said spindles at right angles to each other and movable with respect to each other to accommodate worm elements on different center distances, means for rotating said spindles in synchronism, power means for moving said spindles radially with respect to each other to effect an infeed of said tool, power means operable after the completion of the infeed for modifying the rotative speed of one of said spindles to effect side feed of said tool, and electrically controlled means for controlling the operation of both of said power means, said last named means including means for effecting a side feed in one direction, a dwell at the end of the side feed, a side feed in the opposite direction, and a dwell at the end of the last named side feed.

22. A machine for cutting worm elements comprising a work spindle for driving a worm element, a tool spindle disposed in spaced relation to said element and adapted to mount a tool having cutting edges narrower than full mating width, means mounting said spindles at right angles to each other and movable with respect to each other to accommodate worm elements on different center distances, means for rotating said spindles in synchronism, power means for moving said spindles radially with respect to each other to effect an infeed of said tool, power means operable after the completion of the infeed associated with the means for rotating one of the spindles for modifying the rotative speed of one of said spindles to effect side feed of said tool, and electrically controlled means for controlling the operation of both of said power means in succession.

HARRY PELPHREY.

REFERENCES CITED

The following references are of record in the file of this patent:

UNITED STATES PATENTS

| Number | Name | Date |
| --- | --- | --- |
| 2,275,246 | Caldwell | Mar. 3, 1942 |
| 1,879,196 | Greene | Sept. 27, 1932 |
| 2,152,469 | Edgar | Mar. 28, 1939 |
| 1,885,686 | Cone | Nov. 1, 1932 |